Dec. 22, 1964 B. G. WOOD 3,162,400
RECIPROCATING WING HELICOPTER ADAPTED TO BE MANUALLY POWERED
Filed June 11, 1963 7 Sheets-Sheet 1

INVENTOR:
BENJAMIN G. WOOD
BY Kenwood Ross
ATTORNEY.

INVENTOR:
BENJAMIN G. WOOD
BY Kenwood Ross
ATTORNEY.

Dec. 22, 1964 B. G. WOOD 3,162,400
RECIPROCATING WING HELICOPTER ADAPTED TO BE MANUALLY POWERED
Filed June 11, 1963 7 Sheets-Sheet 3

INVENTOR:
BENJAMIN G. WOOD
BY Kenwood Ross
ATTORNEY.

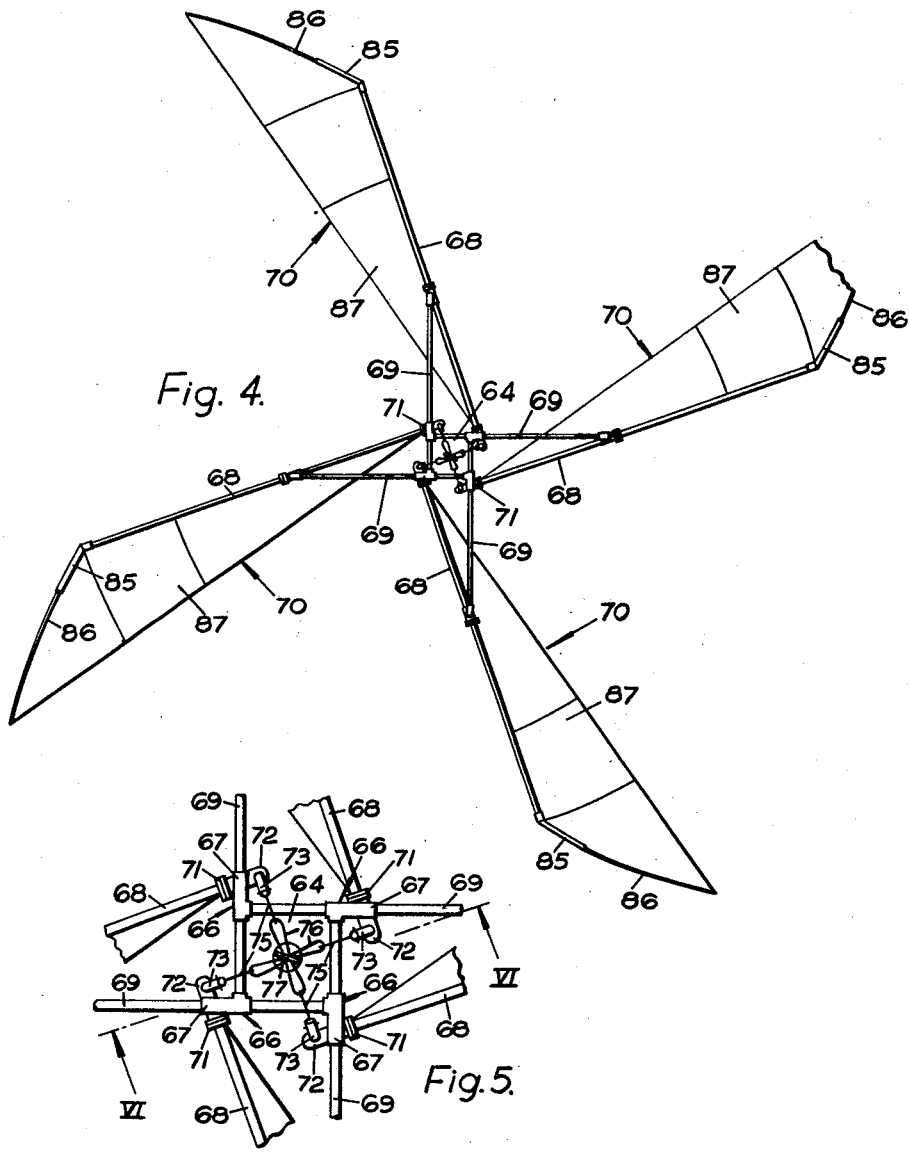

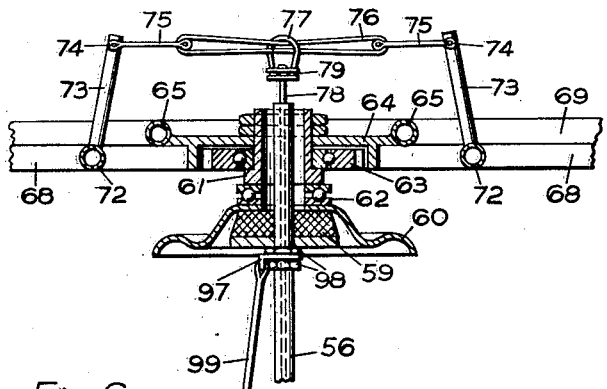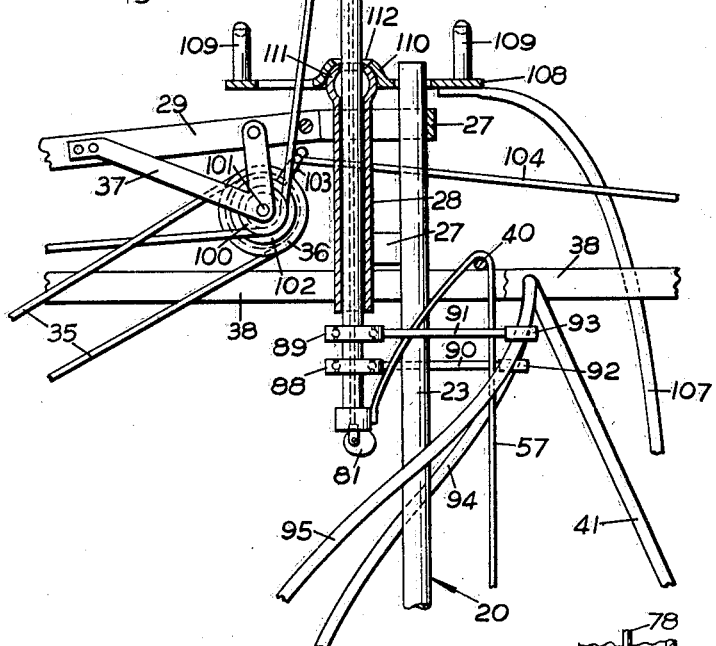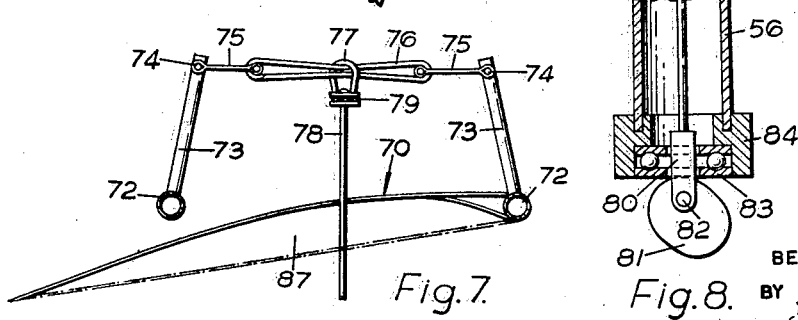

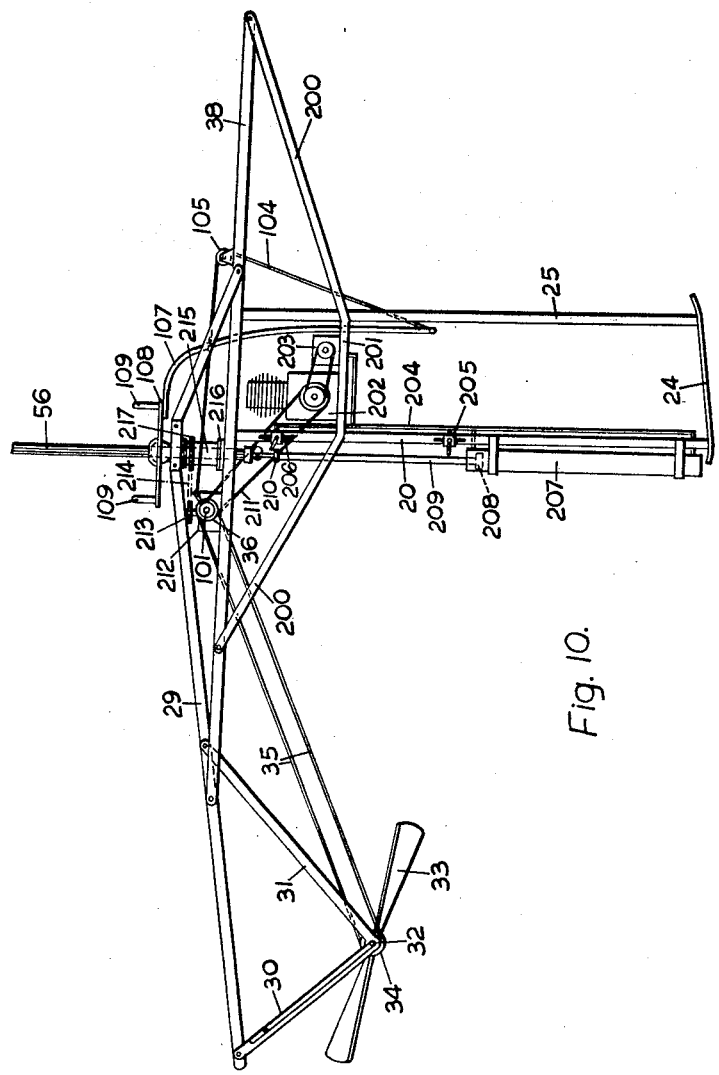

United States Patent Office 3,162,400
Patented Dec. 22, 1964

3,162,400
RECIPROCATING WING HELICOPTER ADAPTED TO BE MANUALLY POWERED
Benjamin Graham Wood, The Coppice, S. Down's Road, Bowden, Cheshire, England
Filed June 11, 1963, Ser. No. 287,140
Claims priority, application Great Britain June 12, 1962
17 Claims. (Cl. 244—17.11)

This invention concerns helicopters.

A bird in flight effectuates relative movements between its wings and body in such manner as to provide intermittent support by relative downward wing thrust alternating with feathering and relative upward movement of the wing, with such action providing for extremely efficient flight with a minimum of energy expenditure.

Efforts have already been made to simulate bird flight by means of winged machines embodying mechanisms for effectively flapping the wings, but none of these has proved to be particularly effective or practical in operation.

Helicopters, which involve the use of vaned or winged rotors which produce a substantially vertical thrust have, of course, proved to be practicable, and engine powered helicopters are in everyday use.

An object of this invention is to provide a novel form of helicopter which, in addition to deriving lift from the normal rotation of the rotors, is adapted to simulate, at least in part, the natural wing movements of a natural bird which, I believe, will provide for extremely improved efficiency, thereby permitting the arrangement, if desired, to be propelled by man power.

With this object in view, the present invention provides a helicopter comprising a main frame or fuselage and a rotor having wings or blades characterised by means for causing up and down movement of the rotor wings or blades so as to impart rotary thrust by reaction of air pressure to the wings or blades of the rotor on the downstroke thereof.

The invention will be described further, by way of example, with reference to the accompanying drawings, in which—

FIG. 4 is a plan view, on a reduced scale, of the rotor of the arrangement of FIGS. 1 to 3, part of one wing having been broken away;

FIG. 5 is an enlarged fragmentary detail of part of FIG. 4;

FIG. 6 is an enlarged fragmentary detail, corresponding to FIG. 1, showing details of the rotor and its mounting on the main frame or fuselage, partly in section;

FIG. 7 is a detached view showing certain of the parts of FIG. 6 and the relative disposition of a wing associated with one of such parts;

FIG. 8 is an enlarged detached view, in cross-section, showing the means for adjusting the feather of the wings of the arrangement of FIGS. 1 to 7;

FIG. 10 is a view similar to FIG. 1, but with the rotor and pilot omitted, showing a motor-powered embodiment of the helicopter.

Figure 1:
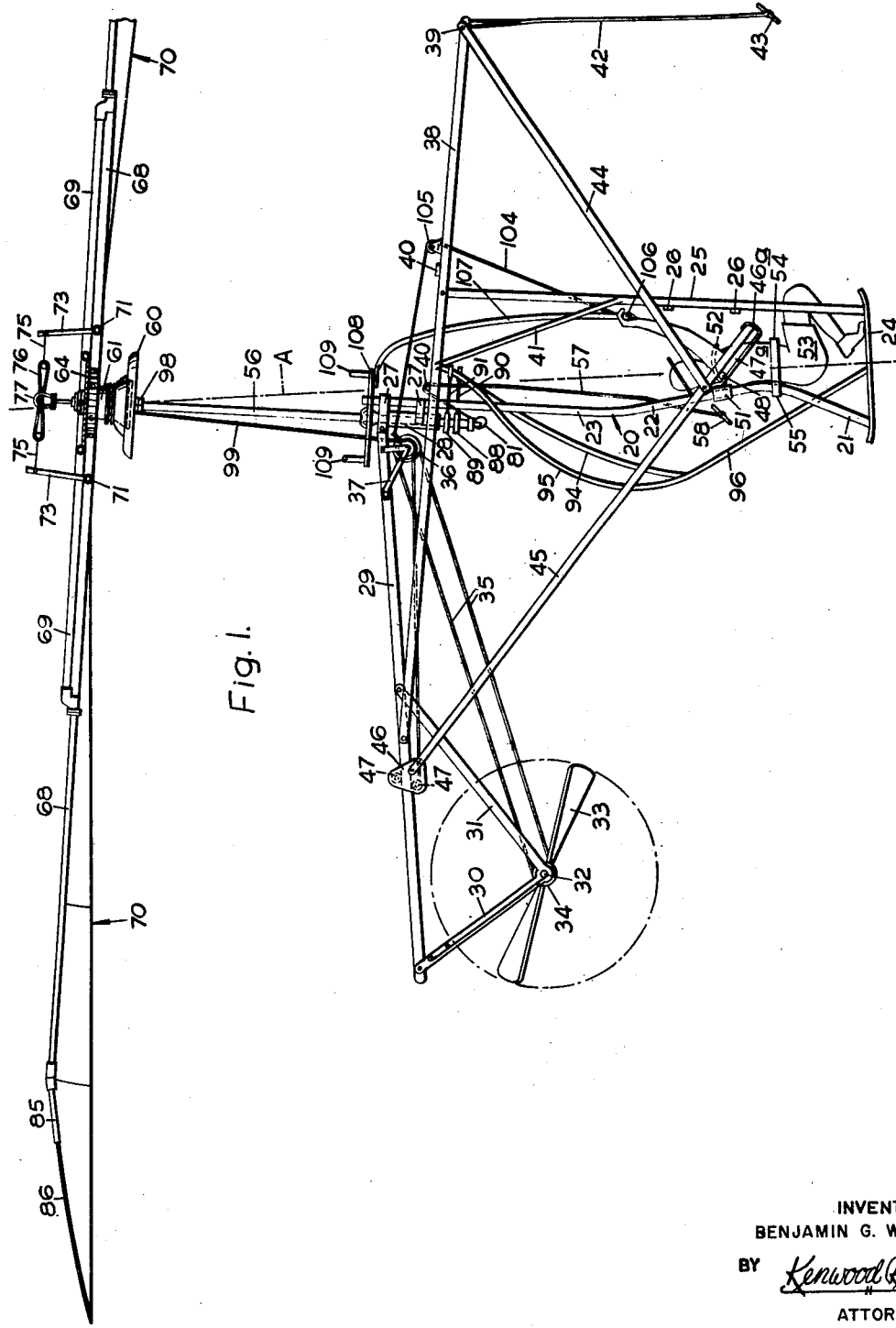
FIG. 1 is a side elevation, partly broken away, of a man-powered helicopter constructed in accordance with this invention, the rotor being shown in a raised position relative to the main frame or fuselage of the helicopter.
Figure 2:
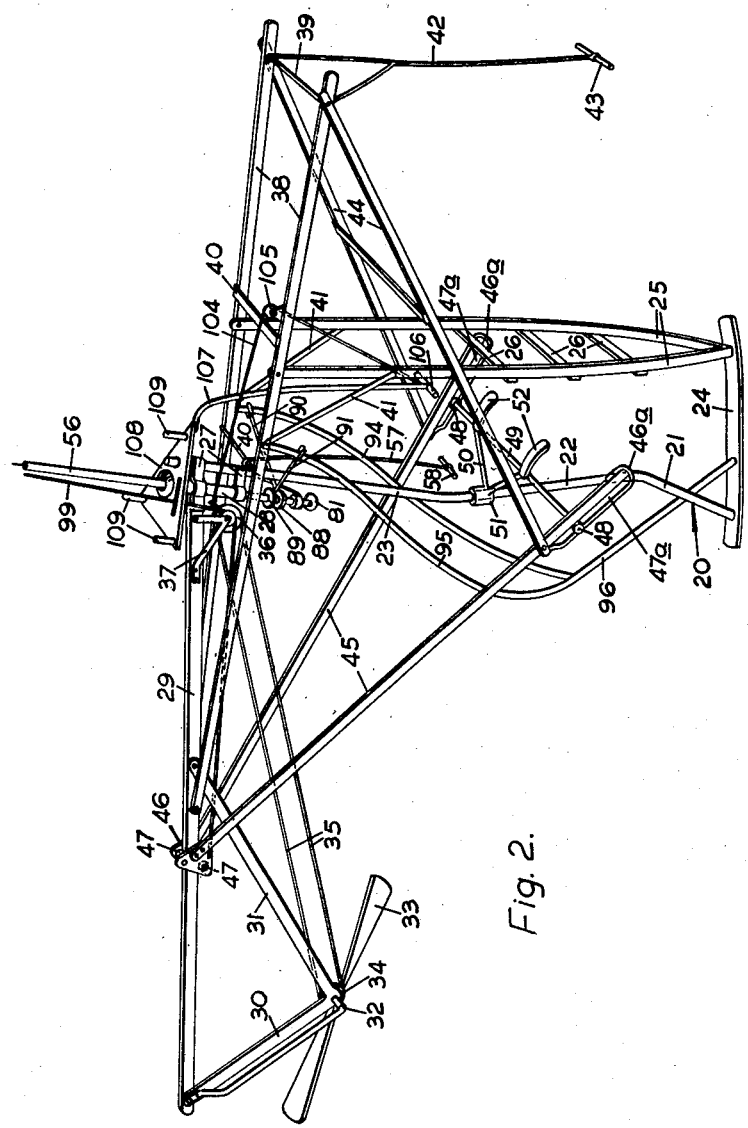
FIG. 2 is a perspective view corresponding to FIG. 1, but with the rotor omitted.

Referring firstly to FIGS. 1 to 9, a man-powered helicopter according to the invention comprises a main frame or fuselage composed of a main column or backbone 20 shaped to provide an upwardly and forwardly inclined base part 21, an upwardly and rearwardly inclined intermediate part 22, and an upwardly and forwardly inclined upper part 23, the parts 22 and 23 merging into one another by a gentle curve, and each being inclined at only a few degrees to the vertical. The backbone 20 is secured, by its bottom end, to a foot plate or skid 24 to which are connected the lower ends of two vertical frame members 25 which diverge from one another in the upward direction from the skid 24, and then extend substantially parallel to one another and generally parallel to the backbone 20.

Rungs 26 extend horizontally between the vertical frame members 25.

At its upper end, the backbone 20 has secured thereto, by bosses 27, a rotor sleeve 28, and in turn such rotor sleeve 28 has connected thereto a rearwardly extending downwardly inclined anti-torque fan arm 29 to which is secured an underhanging angle frame 30, 31 having a horizontal spindle 32 of an anti-torque fan 33 journalled therein. A pulley 34 on such spindle 32 has an endless belt 35 extending therearound, such belt 35 also extending around a drive pulley 36 rotatably mounted on a bracket 37 secured to the fan arm 29 near to the rotor sleeve 28.

A pair of top cross bars 38 of the main frame or fuselage are connected to the fan arm 29 at a point approximately midway along the latter, and these diverge from one another and extend past the rotor sleeve 28 to connect each with the upper end of a respective one of the vertical frame members 25, such cross bars 38 also extending past the members 25 to terminate at a connecting rod 39. Stiffeners 40 and struts 41 are provided for ensuring rigidity of the main frame, and additional stiffeners and struts to those illustrated can, of course, be provided. A short tow rope 42 having a handle 43, and serving to permit a helper to assist maneuvering the helicopter during take-off and landing is secured to the connecting rod 39.

Figure 3:
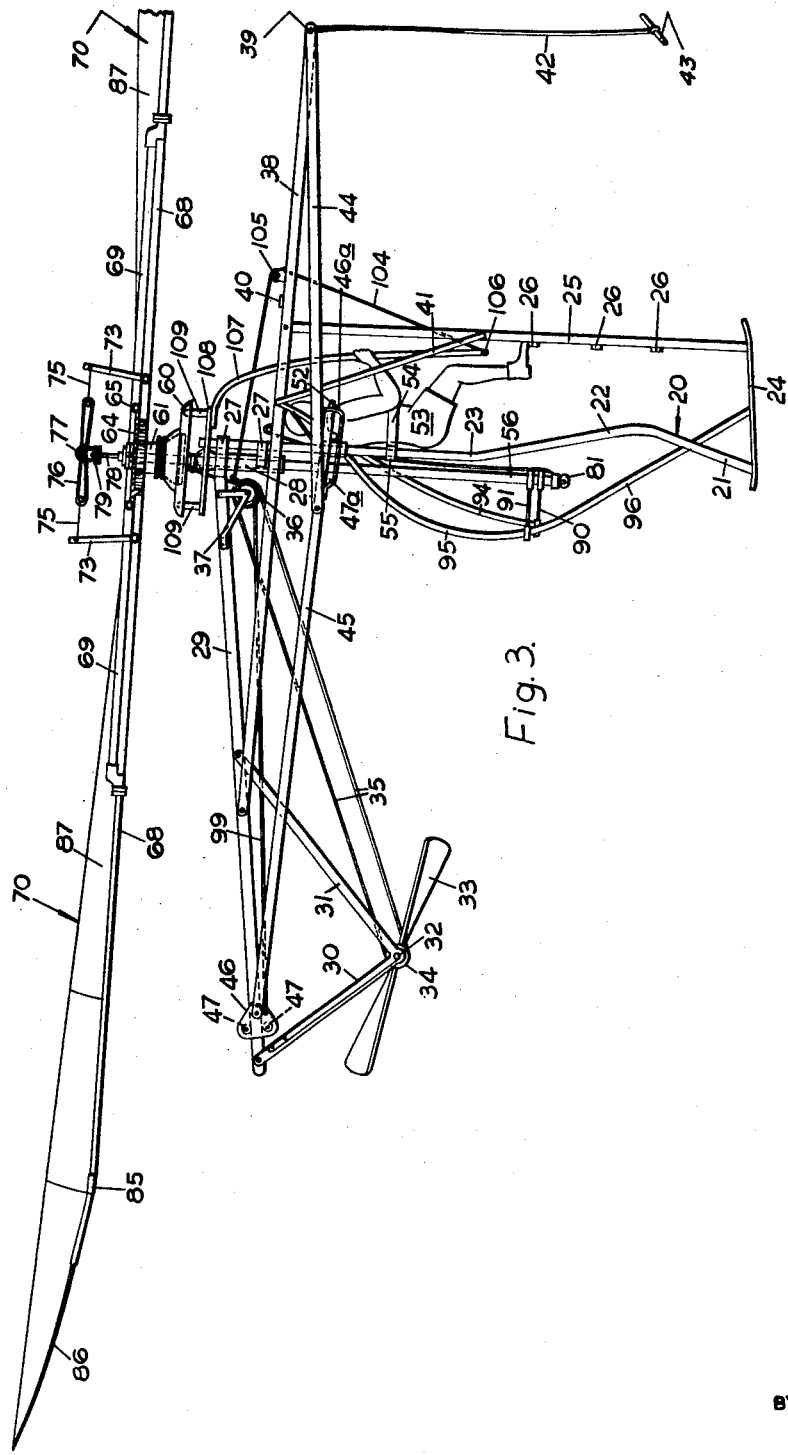
FIG. 3 is a view similar to FIG. 1, but showing the rotor lowered relative to the main frame or fuselage.
Figure 9:
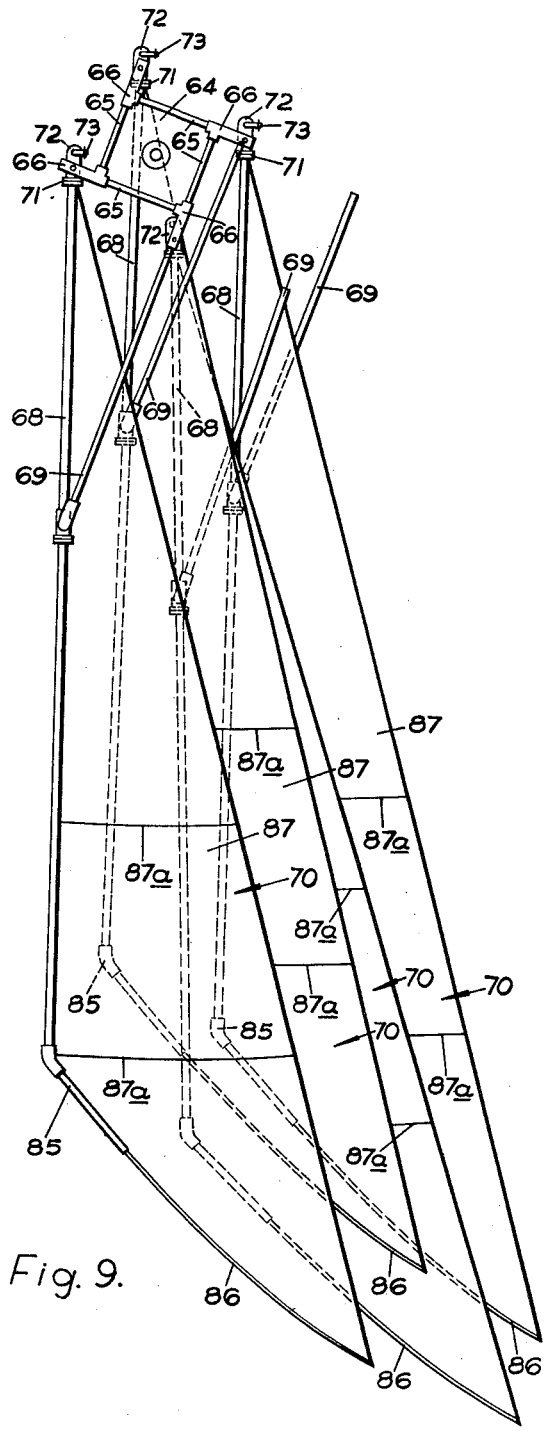
FIG. 9 is a plan view, similar to FIG. 4, but on a larger scale and showing the wings of the rotor folded for storage or like purposes.

The connecting rod 39 provides a pivotal connection between the main frame or fuselage of the helicopter and a pivoted actuating frame thereof. This actuating frame comprises a pair of inclined pivoted arms 44 pivotally mounted each by one end on the connecting rod 39 and pivotally connected by their other ends each near to one end of a respective sliding arm 45, the other ends of which are secured to a slide 46 engaging with the fan arm 29 by rollers 47 and displaceable along such fan arm 29 between the connections therewith of the angle frame 30, 31.

Where such sliding arms 45 extend downwards past their connections with the inclined pivotal arms 44, shaped rods 46a are connected thereto so as to define elongate slots 47a wherein are accommodated rollers 48 provided at the ends of a transverse thrust bar 49 carried by the arms of a yoke 50 which is slidable up and down the backbone 20 by means of a collar 51 which is an easy sliding fit on the backbone 20. Shoulder bars 52 project forwardly from the arms of the yoke 50 and, as shown in FIGS. 1 and 3, a pilot 53 can arrange himself so as to be within the main frame or fuselage, between the backbone 20 and the vertical frame members 25, so that his shoulders abut against the undersides of the shoulder bars 52. A body strap 54 is provided for securing around the waist of the pilot 53 and this has a sleeve 55 which is also an easy sliding fit on the backbone 20 so as to permit the pilot 53 to bend or stretch his body and thereby raise and lower the yoke 50, whilst at the same time remaining reliably secured against falling out of the main frame or fuselage.

Extending upwardly through the rotor sleeve 28 is an approximately vertical hollow rotor shaft 56. At its bottom end, such rotor shaft 56 is connected, by way of a light cable 57 extending over one of the stiffeners 40, to a handle 58. This cable 57 merely serves to permit raising of the rotor (in the manner which will become apparent later) prior to take-off of the helicopter. At its upper end, the rotor shaft 56 has bonded thereto a flexible canvas-bonded rubber block or ring 59 forming a Carden shaft allowing flexure of the shaft after the manner of a universal joint. The ring 59 supports, above it, a rotor disc 60 superimposed by a rotor socket 61. Free wheel bearings 62, 63 are interposed respectively between the rotor disc 60 and the rotor socket 61 and between the rotor socket 61 and a rotor boss 64. Thus, it will be appreciated that when the rotor shaft 56 is rotated, in one direction, such rotation is transmitted to the rotor boss 64, and the latter is capable of being tilted relative to the rotor shaft 56. Also the free wheel bearing 63 will permit revolution of the rotor to exceed the speed of rotation by the shaft.

The rotor boss 64 is substantially square when viewed in plan and has tubular members 65 extending along each side thereof. Each such tubular member 65 has, at each end, a T-piece 66 (see FIG. 5), such T-pieces 66 serving to connect each tubular member 65 to the next adjacent tubular member 65 and additionally providing sockets 67 wherein engage stiffening spars 69 which connect with respective main spars 68 of wings 70 of the rotor of the helicopter. Each such main spar 68 is pivotally connected to the T-piece 66 adjacent to that into which the corresponding stiffening spar 69 engages, by way of end couplings 71 which permit the respective main spars 68 to rotate about their axes, and such main spars 68 project through the couplings 71 and terminate in end pieces 72 each having an upwardly extending post 73 secured thereto. Each such post 73 has a diametrical pin 74 extending therethrough and securing an anchoring link 75 to such post 73, opposed pairs of such links 75 being coupled together by strong endless elastic bands 76 which extend through a stirrup 77 provided on the upper end of a wing feathering adjustment flexible cable 78 which extends axially downwards through the rotor shaft 56. A bearing 79 between the stirrup 77 and the flexible cable 78 permits rotation of the stirrup 77 relative to the flexible cable 78. It will be appreciated that this springing device, which is common to all the rotor wings, equalises or balances the forces on the opposed wings and also absorbs shock, e.g., if one wing tip touches the ground.

At its lower end (see particularly FIG. 8), the wing feathering adjustment flexible cable 78 is secured to a U-bracket 80 having a cam 81 secured between its arms by a pin 82 and engaging against a bearing 83 provided in a rotor shaft socket 84 on the bottom end of the rotor shaft 56. Manual rotation of the cam 81 serves to displace the flexible cable 78 axially within the shaft 56, thereby increasing or decreasing the tension in the elastic bands 76 which, accordingly, varies the angles of the posts 73 to rotate the main spars 68 on their own axes to give corresponding feathering adjustment of the wings 70.

The configuration of the wings 70 can best be seen from FIGS. 4 and 7, and each such wing comprises the main spar 68 and stiffening spar 69 previously described, the free end of each main spar 68 having an angled knuckle 85 connecting a respective flexible rib 86 to such free end of the main spar 68. Triangular fabric panels 87 are secured to such main spars 68, knuckles 85 and ribs 86, and such panels 87 are provided with stiffening ribs 87a in such a way that each panel 87, in the stationary condition of the wings 70, assumes an arched or convexly curved (considered from above) configuration as shown in FIG. 7.

Mounted on the rotor shaft 56, near to the lower end thereof, are two free-wheel sleeves 88 and 89, both arranged so that when rotated in one direction they cause corresponding rotation of the rotor shaft 56 but when rotated in the opposite direction are able to revolve independently of the shaft 56.

Each such sleeve, 88, 89 has a radially extending actuating arm 90, 91 secured thereto, the outer ends of such arms 90, 91 being bifurcated to provide forks 92, 93 each embodying an anti-friction device, which locate around and engage respective spiral guides 94 and 95 which are of opposite hands and are connected, at their lower ends, to a common strut 96 secured to the skid 24 and at their upper ends to the respective top cross bars 38. It will be appreciated that, with this arrangement, when the rotor shaft 56 is displaced axially upwards through the rotor sleeve 28 the two rotor actuating arms 90, 91 are caused by their respective spiral tubes 94 and 95, to swing around the axis of the rotor shaft 56, in opposed directions. Thus, one of such arms 90, 91 serves to rotate the rotor shaft 56. Conversely, when the rotor shaft 56 is displaced axially downwardly, the arms 90, 91 are correspondingly swung in the opposite directions to previously, and the other of such arms 90, 91 serves to impart rotational movement, in the same direction as before, to the rotor shaft 56.

Attached to an anchor bracket 97 secured to the rotor shaft 56 beneath the rubber block 59, by means of bearings 98 permitting rotation of the bracket 97 relative to the shaft 56, is one end of a strong flexible steel cable 99 arranged to pull the shaft 56 downwards axially when the slide 46 is forced outwardly along the arm 29. Such cable 99 passes around a pulley 100 provided on spindle 101 whereon the drive pulley 36 for the steering fan 33 is disposed, a clutch 102 being interposed between the pulleys 100 and 36. The clutch 102 has a radial actuating lever 103 connected to a clutch control rope 104 which extends around a guide pulley 105 supported upon one of the top cross bars 38 and is attached by its remote end to a control handle 106 secured to the lower end of a rotor control stick 107. The other end of the cable 99 is secured to the slide 46.

Because of up and down movement of the rotor the means for tilting the rotor requires a novel form of control and the rotor control stick 107 is secured, by its upper end, to a triangular rotor control plate 108 having an upstanding post 109 at each corner and disposed so that in the lowered condition of the rotor (as shown in FIG. 3) the rotor disc 60 rests on such posts 109. As can be seen in FIG. 6, the rotor control plate 108 has a dished centre 110 resting upon a ball-shaped head 111 on the upper end of the rotor sleeve 28. An aperture 112 provided in the dished centre 110 is of considerably larger diameter than the outside diameter of the shaft 56, and accordingly the arrangement permits the rotor control plate 108 (and also the rotor disc 60 and the whole of the rotor, when the latter is in the lowered position of FIG. 6) to be tilted relative to the axis of the rotor shaft 56, by means of the rotor control stick 107.

The mode of operation of the helicopter is as follows:
Assuming the rotor initially in its lowermost position as is shown in FIG. 3, and the helicopter to be stationary on the ground, the pilot 53 takes up his position standing on the skid 24 and secures the waist belt 54 around his waist.

It is now necessary to effect initial raising of the rotor, and this is done by either the pilot 53, or an assistant, hauling on the cable 57 by means of the handle 58. This causes the rotor shaft 56 to be displaced axially upwards through the rotor sleeve 28, and the cable 99 simultaneously draws the slide 46 along the fan arm 29 towards the rotor sleeve 28. The movement of the cable 99 causes rotation of the fan pulley 36 assuming the clutch 102 to be engaged, the fan driving belt 35 causes rotation of the fan 33. Also, during the raising of the rotor, the radial arms 90, 91 are swung about the axis of the shaft 56 and consequently cause initial rotation of the shaft 56 and the rotor. The helicopter is now in the condition illustrated in FIG. 1, the shoulder bars 52 resting on the shoulders of the pilot 53 who will have taken up a "knees bent" position as shown in FIG. 1.

Vertical upward thrust on the shoulder bars 52 causes pivoted arms 44 and sliding arm 45 to pivot relatively to one another and force slide 47 rearwardly three or more feet along the arm 29 thereby pulling cable 99 around pulley 100 and forcing down the rotor.

A helper (not shown) will normally assist the pilot during take-off by means of the tow rope 42.

To commence flying, the pilot now causes continued rotation of the rotor whilst simultaneously causing alternating lowering and raising of the rotor. These latter movements impart the main rotary force to the rotor, during the downward beat of the wings 70 thereof, by reason of reaction of air pressure on the undersides of the wings which are momentarily at a negative angle to their forward progress. The pilot causes the up and down rotor movement by firstly straightening his knees, then stretching his body to an upright position, and finally by raising his body relative to the main frame or fuselage, by walking or running up the rungs 26, until he reaches the position shown in FIG. 3. During such movement, which is effected quickly and vigorously, the pilot 53 displaces the yoke 50 up the backbone 20 thereby displacing the pivoted arms 44 and the sliding arms 45 to the FIG. 3 position. The slide 47 pulls the rotor shaft 56 downwards by means of the rotor drive cable 99, thereby creating an upward lift by reaction of the rotor wings 70 against the air below such wings. Rotation of the rotor shaft is maintained by the appropriate radial arm 90 or 91 being swung around the axis of shaft 56 by its respective spiral tube 94 or 95.

At the end of the rotor lowering or beating action, the pilot 53 turns to the FIG. 1 position again, reaction of the air beneath the rotor wings 70 serving to lift the rotor to the top of the stroke and allowing downward movement of the fuselage relative to the rotor. The shape of the backbone 20, as previously described, is such as to insure that the centre of the load always remains beneath the axis of the rotor as indicated by the line A on FIG. 1, and this preserves equilibrium in flight.

When the rotor and wings are forced down the load on the rotor is momentarily increased. The wings 70 and the end pieces 72 flex, thereby stretching the bands 76, so that the wings 70 flex to a substantially negative angle of attack or incidence to their helical flight path (see FIG. 7) which drives the wings forwardly after the manner of bird flight, except that the rotor wings follow one another around thereby accelerating the speed of the rotor. Upon the upward movement of the wings they feather or tilt to a positive angle as illustrated in FIG. 7 and fly upwards again to the top of the stroke. The resultant movement of the helicopter rotor blades or wings is therefore somewhat of a flapping action similar to that which occurs when a natural bird is in flight except that the wings follow one another around the rotor axis.

It will be appreciated, from the foregoing, that the action of the helicopter is such as to provide for intermittent loading of the rotor by raising and lowering the centre of gravity of the helicopter relative to the centre of pressure or air lift, in conjunction with a feathering action of the blades or wings of the rotor, such feathering being induced automatically by the mode of working of the arrangement. For guiding the helicopter, the rotor can, of course, be tilted by means of the rotor control stick 107, and also the speed of the anti-torque fan 33 can be varied, to permit rotation of the helicopter frame or body for steering purposes during flight, by means of the clutch 102. When it is desired to store the helicopter away, the wings 70 can be folded in the manner shown in FIG. 9, after freeing the stiffening spars 69 from their respective sockets 67. With the wings 70 so folded, the helicopter can be stored away conveniently in a domestic garage.

It is anticipated that the man-powered embodiment of the apparatus, as described in the foregoing, will be satisfactory for short flights at a comparatively low altitude, but take-off on a hillside or the like can be effected, using the power of rising winds, with or without the assisting towing, particularly where it is desired to effect gliding or soaring with the helicopter, which is less fatiguing than continuous man powered flight.

It is evident, of course, that the pilot can determine the stroke imparted to the rotor in its up and down movement, during flight, by the amount he raises and lowers the yoke 50, and that the spiral tubes 94, 95 always ensure that positive rotation is imparted to the rotor, regardless of the stroke. A pedal driven or other arrangement for driving and/or raising and lowering the rotors would be beset with considerable difficulties insofar as varying the stroke is concerned.

Variations can, of course, be made to the details of the helicopter, more particularly to the various means provided for rotating the rotor, for causing relative up and down movement of the rotor, for rotating the anti-torque fan, and for controlling the helicopter.

FIG. 10 of the drawings illustrates an embodiment of the helicopter which is comparable with that already described but is engine powered. In this figure, similar reference numerals have been allocated to those parts which are similar to those already described, and it will be noted that the top cross bars 38 have connected there to stationary struts 200 which connect with motor support bars 201 secured horizontally between the backbone 20 and uprights 25 of the fuselage of the machine. A single cylinder engine 202 is mounted in the fuselage by the bars 201 and this serves to drive a pump 203 connected by tubes 204 through change-over valves 205, 206, to a double acting ram 207 having a piston 208 whose rod 209 connects with the lower end of the rotor shaft which is longitudinally fluted.

The change-over valves 205, 206 are adjustable along the backbone 20 and lie in the path of a flange 210 on the piston rod 209 the arrangement being such that when the flange 210 engages one or other of the two valves 205, 206, the direction of flow of hydraulic fluid from the pump 203 to the ram 207 is changed so as to reverse the direction of operation of the ram 207. This arrangement serves, therefore, to displace the rotor shaft 56 axially up and down with an amplitude which is adjustable by adjusting the positions of the valves 205 and 206 on the backbone 20.

The motor 202 also serves to drive the drive pulley 36 by an endless chain 211 and the spindle 101 of such pulley 36 is journalled in a gear box 212 so as to impart drive to a rotor driving sprocket 213 which serves, by means of a chain 214, to drive a rotor sleeve 215 which is journalled by bearings 216 on a support (not visible) extending between the cross bars 38, by way of sleeve sprocket 217. The sleeve 215 is internally fluted complementarily to the shaft 56, so that the latter is constrained to rotate with the sleeve 215 whilst at the same time being axially slidable therein.

The mode of operation of this embodiment of the helicopter will be evident from the foregoing. The flying action thereof is similar to that of the embodiment of FIGS. 1 to 9, in that it provides for rotation of the rotor combined with simultaneous raising and lowering of the rotor relative to the fuselage and the rotor stroke can be varied by adjustment of the valves 205 and 206. If desired, this can be done during flight. Obviously, however, such actions are produced by the motor 202 and not by the pilot's own movements, and consequently the range of the machine and the height to which it can be flown, is considerably increased as compared with the man-powered embodiment.

I claim:

1. A helicopter comprising, a main frame, a rotor having following airfoils, means for effecting vertical reciprocation of said rotor in relation to said main frame for imparting rotary thrust by the reaction of air pressure on the following airfoils during rotor downstroke, and supplemental means for maintaining rotary speed more particularly during rotor upstroke.

2. A helicopter in accordance with claim 1, in which the following airfoils of said rotor are arranged for feathering to a negative angle of incidence during rotor downstroke and to a positive angle of incidence during rotor upstroke.

3. A helicopter according to claim 1, in which said rotor freely revolves on a vertically-disposed axis on free wheel bearings during downstroke and is rotated by ratchets for rotary drive more particularly during upstroke.

4. A helicopter according to claim 1, in which rotary drive is transmitted to the shaft of said rotor by cranks engaging the rotor shaft by ratchet free wheel bearings, the cranks engaging at their outer ends opposed spiral like guide members, and with one ratchet rotary drive working on downstroke and one working on upstroke to effect continuous rotor rotation in a single direction.

5. A helicopter according to claim 1, for gliding and soaring operations, and including means facilitating kite-like towing.

6. A helicopter comprising, a main frame, a rotor having a pair of following airfoils, means for effecting vertical reciprocation of said rotor relative to said main frame with rotary thrust being imparted by the reaction of air pressure on the airfoils of said rotor during rotor downstroke, and supplemental means for maintaining rotary speed during rotor upstroke, the airfoils of said rotor being arranged for feathering to a negative angle of incidence during rotor downstroke and to a positive angle of incidence during rotor upstroke, with the vertically reciprocating action of the up and down strokes of said rotor in relation to said main frame being supplemented by additional vertical reciprocation of the main aircraft load in relation to both said main frame and rotor with resultant greater travel of the up and down strokes of the center of lift of said rotor in relation to the aircraft center of gravity.

7. A helicopter in accordance with claim 6 and being arranged for operation by man power, including, means allowing the pilot quickly to raise his weight in relation to said main frame for allowing vertical reciprocation of the weight of the pilot and consequent increased travel of the aircraft center of gravity in relation to the rotor center of lift.

8. The helicopter as claimed in claim 7, with said reciprocating means for causing vertical movement of said rotor comprising, a vertically-slideable fitting engageable with the person of the pilot and functioning responsively to the moving of his body.

9. A helicopter as claimed in claim 8, with said reciprocating means being engageable with the person of the pilot through a shoulder yoke.

10. The helicopter as claimed in claim 7, with said reciprocating means for causing vertical movement of said rotor comprising a yoke engageable by the shoulders of the person of the pilot and a pivoted thrust frame displaceable by said yoke whereby the power of the pilot allows a mechanical advantage via straightening members connected through a knee-like joint during rotor downstroke for relieving the person of the pilot of back thrust as the knee-like joint is substantially straightened.

11. A helicopter as claimed in claim 7, with said reciprocating means including, a downwardly-inclined arm secured to said main frame, a slide slideable along said downwardly-inclined arm, a thrust frame pivotally attached to said main frame and connected to said slide for slideably displacing the slide along said arm, a cable engageable with said slide and arranged for down pulling said rotor with slide movement being translated into vertical rotor movement, and an anti-torque fan disposed upon said arm and being driven by the shaft of said rotor, whereby manual operation of the thrust frame simultaneously reciprocates the rotor and drives the anti-torque fan.

12. A helicopter as claimed in claim 7, including a yoke engageable with the person of the pilot, and a backbone-like guide member fixed to said main frame for sliding engagement therewith by said yoke for maintaining balance by keeping the center of gravity of the aircraft positioned substantially vertically under the center of lift of said rotor.

13. A helicopter in accordance with claim 7, including means for disconnecting the blades of said rotor for allowing the blades to be swung into vertically-aligned coincidence in a storage position.

14. A helicopter in accordance with claim 7, including means for dismounting said rotor.

15. A helicopter according to claim 7, including a stability connection for effecting automatic adjustment of one of said airfoils to an increased angle of incidence responsive to the excessive pressure on the opposite of said blades for equalizing the lift of opposite blades of said rotor.

16. A helicopter comprising, a main frame, a rotor having a pair of following blades, reciprocating means for causing up and down movement of said rotor in relation to the center of gravity and for imparting rotary thrust by reaction of air pressure to the blades of said rotor during rotor downstroke, the blades of said rotor being arranged for feathering to a negative angle of incidence during rotor downstroke and to a positive angle of incidence during rotor upstroke, and means for rotating said rotor more particularly during rotor upstroke supplemental to the thrust imparted by the rotor downstroke.

17. A helicopter comprising, a main frame, a rotor having at least two following blades and including means for causing up and down bodily movement of said rotor and constituting the means for imparting rotary thrust by reaction of air pressure to the blades of said rotor during rotor downstroke, the blades of said rotor being arranged for feathering to a negative angle of incidence during rotor downstroke and to a positive angle of incidence during rotor upstroke, and means for tilting said rotor at certain positions of rotor upstroke and downstroke by operator control.

References Cited in the file of this patent
UNITED STATES PATENTS

| 1,831,655 | De Korwin | Nov. 10, 1931 |
| 1,963,528 | Pitter | June 19, 1934 |
| 2,064,223 | Rothenhoefer | Dec. 15, 1936 |
| 2,086,883 | Shanley | July 13, 1937 |

FOREIGN PATENTS

| 184,690 | Great Britain | Aug. 24, 1922 |